United States Patent
Burton et al.

(10) Patent No.: US 9,426,523 B2
(45) Date of Patent: Aug. 23, 2016

(54) VIDEO COMPOSITION BY DYNAMIC LINKING

(71) Applicant: International Business Machines Corporation, Armonk, NY (US)

(72) Inventors: Peter H. Burton, Vancouver (CA); Manvendra Gupta, Brampton (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 29 days.

(21) Appl. No.: 14/314,765

(22) Filed: Jun. 25, 2014

(65) Prior Publication Data

US 2015/0382056 A1   Dec. 31, 2015

(51) Int. Cl.
| | |
|---|---|
| *H04N 21/44* | (2011.01) |
| *H04N 21/4402* | (2011.01) |
| *H04N 21/462* | (2011.01) |
| *H04N 21/4627* | (2011.01) |
| *G11B 27/02* | (2006.01) |

(52) U.S. Cl.
CPC ......... *H04N 21/44016* (2013.01); *G11B 27/02* (2013.01); *H04N 21/4402* (2013.01); *H04N 21/44008* (2013.01); *H04N 21/4622* (2013.01); *H04N 21/4627* (2013.01)

(58) Field of Classification Search
CPC .............. G06Q 20/1235; G06F 17/30424; G06F 17/30017; G06F 21/105; G06F 21/60; G06F 21/10; H04L 65/4084; H04L 65/602; H04L 67/04; H04L 67/20; H04N 21/8549; H04N 21/233; H04N 21/8456; H04N 21/252; H04N 21/25891; H04N 21/23418; H04N 21/44016; H04N 21/44008; H04N 21/4402; H04N 21/4622; H04N 21/4627; G06K 9/00711; G11B 27/02
See application file for complete search history.

(56) References Cited

U.S. PATENT DOCUMENTS

| | | | |
|---|---|---|---|
| 6,076,104 A | 6/2000 | McCue | |
| 6,636,237 B1 | 10/2003 | Murray et al. | |
| 7,356,830 B1 | 4/2008 | Dimitrova | |
| 8,065,615 B2 | 11/2011 | Murray et al. | |
| 8,180,469 B1* | 5/2012 | Fitch | G11B 27/105 700/94 |
| 8,181,204 B2 | 5/2012 | Clapper | |
| 8,438,602 B2 | 5/2013 | Rao | |
| 8,457,214 B2 | 6/2013 | Baird et al. | |
| 2002/0073149 A1 | 6/2002 | Young | |
| 2007/0067482 A1* | 3/2007 | Johnson | H04N 21/4623 709/231 |
| 2007/0203845 A1* | 8/2007 | Gross | G06Q 30/06 705/59 |
| 2008/0178230 A1* | 7/2008 | Eyal | H04N 21/8153 725/86 |

(Continued)

*Primary Examiner* — Randy Flynn
(74) *Attorney, Agent, or Firm* — Ronald Kaschak; Andrew M. Calderon; Roberts Mlotkowski Safran & Cole, P.C.

(57) ABSTRACT

A computer receives one or more media content source locations. The computer determines two or more media content items associated with the one or more received media content source locations. The computer negotiates digital rights associated with the two or more media content items. The computer pre-fetches the two or more media content items from the one or more media content source locations. The computer determines at least one digital characteristic of a first media content item of the two or more media content items does not match at least one digital characteristic of a second media content item of the two or more media content items. The computer resamples the first media content item of the two or more media content items. The computer publishes a composition of the two or more media content items to appear as one linked asset with uniform digital characteristics.

17 Claims, 4 Drawing Sheets

(56) References Cited

U.S. PATENT DOCUMENTS

| | | | |
|---|---|---|---|
| 2008/0215620 A1* | 9/2008 | Folgner | G06Q 10/10 |
| 2008/0240490 A1* | 10/2008 | Finkelstein | H04N 21/235 |
| | | | 382/100 |
| 2010/0169977 A1* | 7/2010 | Dasher | H04N 21/21 |
| | | | 726/26 |
| 2010/0257569 A1* | 10/2010 | O'Hanlon | H04N 21/4307 |
| | | | 725/110 |
| 2010/0333154 A1* | 12/2010 | Dasher | H04N 21/8586 |
| | | | 725/98 |
| 2011/0161409 A1* | 6/2011 | Nair | G06F 8/38 |
| | | | 709/203 |
| 2011/0296467 A1 | 12/2011 | Vaysman et al. | |
| 2011/0307781 A1* | 12/2011 | Sood | H04N 21/8456 |
| | | | 715/716 |
| 2012/0076357 A1* | 3/2012 | Yamamoto | H04N 21/252 |
| | | | 382/103 |
| 2013/0084053 A1 | 4/2013 | Ackermann et al. | |
| 2013/0188094 A1 | 7/2013 | Samadani et al. | |
| 2014/0019583 A1* | 1/2014 | Sethuraman | H04L 65/601 |
| | | | 709/217 |
| 2014/0096263 A1* | 4/2014 | Mallardo | G06Q 20/1235 |
| | | | 726/27 |
| 2014/0219630 A1* | 8/2014 | Minder | H04N 21/47202 |
| | | | 386/241 |
| 2014/0280688 A1* | 9/2014 | Mao | H04N 21/23109 |
| | | | 709/214 |

* cited by examiner

FIG. 4

# VIDEO COMPOSITION BY DYNAMIC LINKING

BACKGROUND OF THE INVENTION

The present invention relates generally to the field of streaming media, and more particularly to dynamically linking video from distributed sources.

Consumers are continually demanding increased flexibility in viewing streaming and other forms of media. Streaming media is multimedia that is constantly received by and presented to an end-user while being delivered by a provider. The term "streaming media" can apply to media other than video and audio such as live closed captioning, ticker tape, and real-time text, which are all considered "streaming text". Whereas television viewing traditionally involved watching imagery received on a broadcast signal on a conventional television set, modern media experiences allow media content to be provided via broadcast, cable, satellite, portable media (e.g., DVD) and other sources. Further, the Internet and other relatively high-bandwidth networks now allow media content to be streamed or otherwise delivered to any number of devices (e.g., wireless phones, computers, tablets, etc.) that previously were not typically used for viewing media content. Consumers are therefore able to view media content on a wide variety of devices and in a wide variety of locations.

The advent of digital media and analog/digital conversion technologies, especially those that are usable on mass-market general-purpose personal computers, has vastly increased the concerns of copyright-dependent individuals and organizations, especially within the music and movie industries, because these individuals and organizations are partly or wholly dependent on the revenue generated from such works. Digital Rights Management (DRM) is a class of technologies that hardware manufacturers, publishers, copyright holders, and individuals use with the intent to control the use of digital content and devices after sale. The intent of DRM is to control executing, viewing, copying, printing and altering of works or devices. DRM technologies attempt to give control to the seller of digital content or devices after a consumer purchase. For digital content this means preventing the consumer access, or denying the user the ability to copy the content or to convert the content to other formats.

SUMMARY

According to one embodiment of the present invention, a method for media content composition from distributed sources is provided. The method may include a computer processor receiving one or more media content source locations. The computer processor determines two or more media content items associated with the one or more media content source locations. The computer processor negotiates digital rights associated with the two or more media content items. The computer processor, responsive to negotiating digital rights associated with the two or more media content items, pre-fetches the two or more media content items from the one or more media content source locations. The computer processor determines at least one digital characteristic of a first media content item that does not match at least one digital characteristic of a second media content item of the two or more media content items. The computer processor, responsive to determining at least one digital characteristic of a first media content item that does not match at least one digital characteristic of a second media content item of the two or more media content items, resamples the first media content item of the two or more media content items. The computer processor publishes a composition of the two or more media content items to appear as one linked asset with uniform digital characteristics.

DETAILED DESCRIPTION

As current events evolve, the media coverage of the events may be continuously updated. Companies in the media industry often invest resources in recording, processing, and editing media content as an event evolves. In addition, there is often a high cost associated with storing video content (including backup and resiliency abilities). Many organizations also do periodic updates, recording content at a certain frequency or based on events. There is a need for a systematic means of recording content once and replacing segments that become outdated over time. Often, when video segments are linked, there is a lag between the playing of one video to another. Even if there is no lag, the user is generally aware of a new video being played.

Embodiments of the present invention recognize that efficiency can be gained by implementing a method of dynamically linking video segments from distributed sources by pre-fetching and resampling the video segments to produce one video that plays seamlessly for a user. Implementation of embodiments of the invention may take a variety of forms, and exemplary implementation details are discussed subsequently with reference to the Figures.

Figure 1:
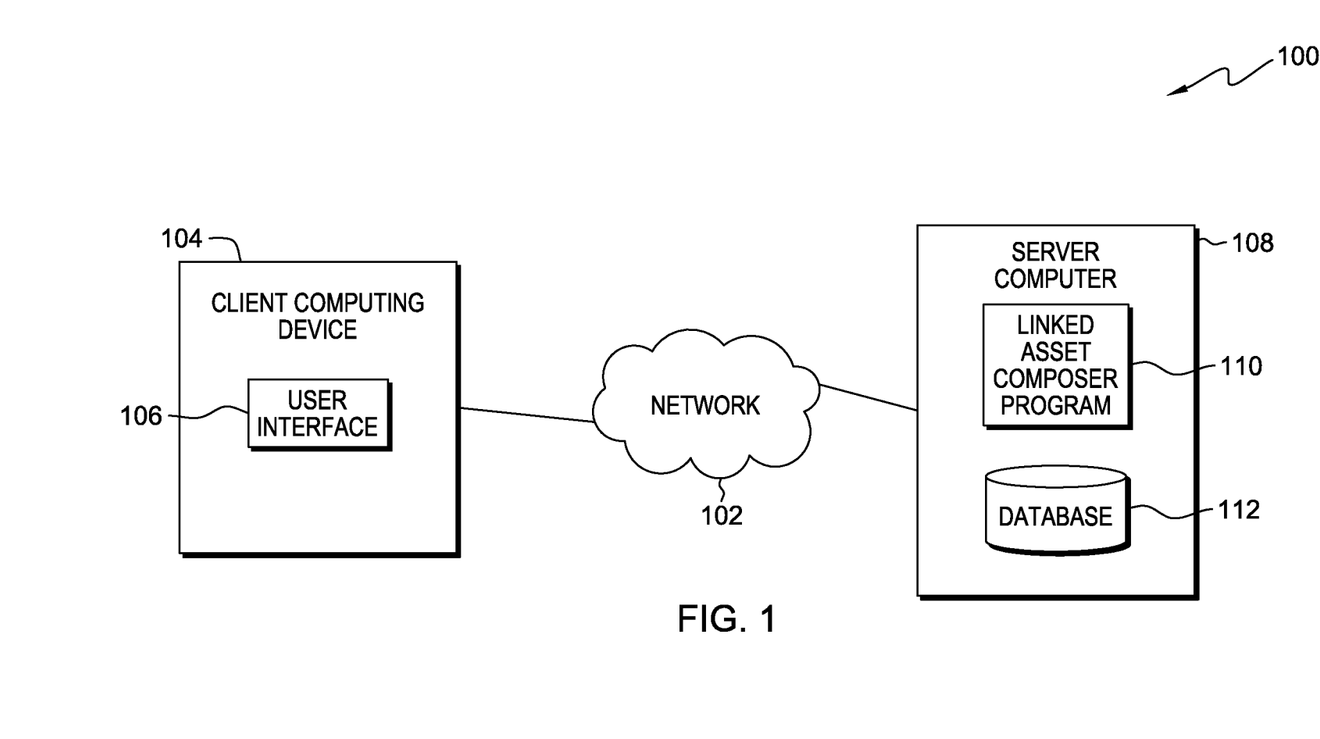
FIG. 1 is a functional block diagram illustrating a video data processing environment, in accordance with an embodiment of the present invention.

FIG. 1 is a functional block diagram illustrating a video data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Video data processing environment 100 includes client computing device 104 and server computer 108, interconnected over network 102. Network 102 can be, for example, a telecommunications network, a local area network (LAN), a wide area network (WAN), such as the Internet, or a combination of the three, and can include wired, wireless, or fiber optic connections. Network 102 may include one or more wired and/or wireless networks that are capable of receiving and transmitting data, voice, and/or video signals, including multimedia signals that include voice, data, and video information.

Client computing device 104 may be a desktop computer, a laptop computer, a tablet computer, a specialized computer server, a smart phone, or any programmable electronic device capable of communicating with server computer 108 via network 102 and with various components and devices within video data processing environment 100. Client computing device 104 may be a wearable computer. Wearable computers are miniature electronic devices that may be worn by the bearer under, with or on top of clothing, as well as in glasses, hats, or other accessories. Wearable computers are especially useful for applications that require more complex computational support than just hardware coded logics. In general, client computing device 104 represents any programmable electronic device or combination of programmable electronic devices capable of executing machine readable program instructions and communicating with other computing devices via a network, such as network 102. Client computing device 104 includes user interface 106.

User interface 106 is a program that provides an interface between a user of client computing device 104 and server computer 108. A user interface, such as user interface 106, refers to the information (such as graphic, text, and sound) that a program presents to a user and the control sequences the user employs to control the program. There are many known types of user interfaces. In one embodiment, user interface 106 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. User interface 106 enables a user of client computing device 104 to communicate specific information to server computer 108 regarding media content items the user wants to link together.

Server computer 108 may be a management server, a web server, or any other electronic device or computing system capable of receiving and sending data. In other embodiments, server computer 108 may represent a server computing system utilizing multiple computers as a server system, such as in a cloud computing environment. In another embodiment, server computer 108 may be a laptop computer, a tablet computer, a netbook computer, a personal computer (PC), a desktop computer, a personal digital assistant (PDA), a smart phone, or any programmable electronic device capable of communicating with client computing device 104 via network 102. In another embodiment, server computer 108 represents a computing system utilizing clustered computers and components to act as a single pool of seamless resources. Server computer 108 includes linked asset composer program 110 and database 112.

In an exemplary embodiment, linked asset composer program 110 dynamically links media content items, for example video segments, from distributed sources such that the composition of the video segments appears as a single, seamless video to a viewer. In another embodiment, linked asset composer program 110 may dynamically link other media content items, such as audio segments, from distributed sources. Audio segments may include journalistic audio segments and recorded music. Distributed sources refers to different origins of the media content items, for example, linked asset composer program 110 may upload an existing video or link to and download other videos, either locally or on a plurality of websites on the Internet. Linked asset composer program 110 receives a request from a user to link video segments from various sources. The user defines the sources as well as the time index and duration of the desired segment. Linked asset composer program 110 receives the user's request and negotiates the rights and/or pricing via digital rights management (DRM). Linked asset composer program 110 pre-fetches and resamples the video segments such that the segments have the same visual attributes, for example, dimensions, frame rate, and quality. Linked asset composer program 110 links the segments and publishes the video. Linked asset composer program 110 is depicted and described in further detail with respect to FIGS. 2 and 3.

Database 112 resides on server computer 108. In another embodiment, database 112 may reside on client computing device 104, or elsewhere in the environment. A database is an organized collection of data. Database 112 can be implemented with any type of storage device capable of storing data that may be accessed and utilized by server computer 108, such as a database server, a hard disk drive, or a flash memory. In other embodiments, database 112 can represent multiple storage devices within server computer 108. Database 112 stores the fetched video segments as well as the final, published video composition. Database 112 may also store the links to the video segment sources in addition to the resampling information. Database 112 may also store the DRM history and associated negotiations.

Figure 2:
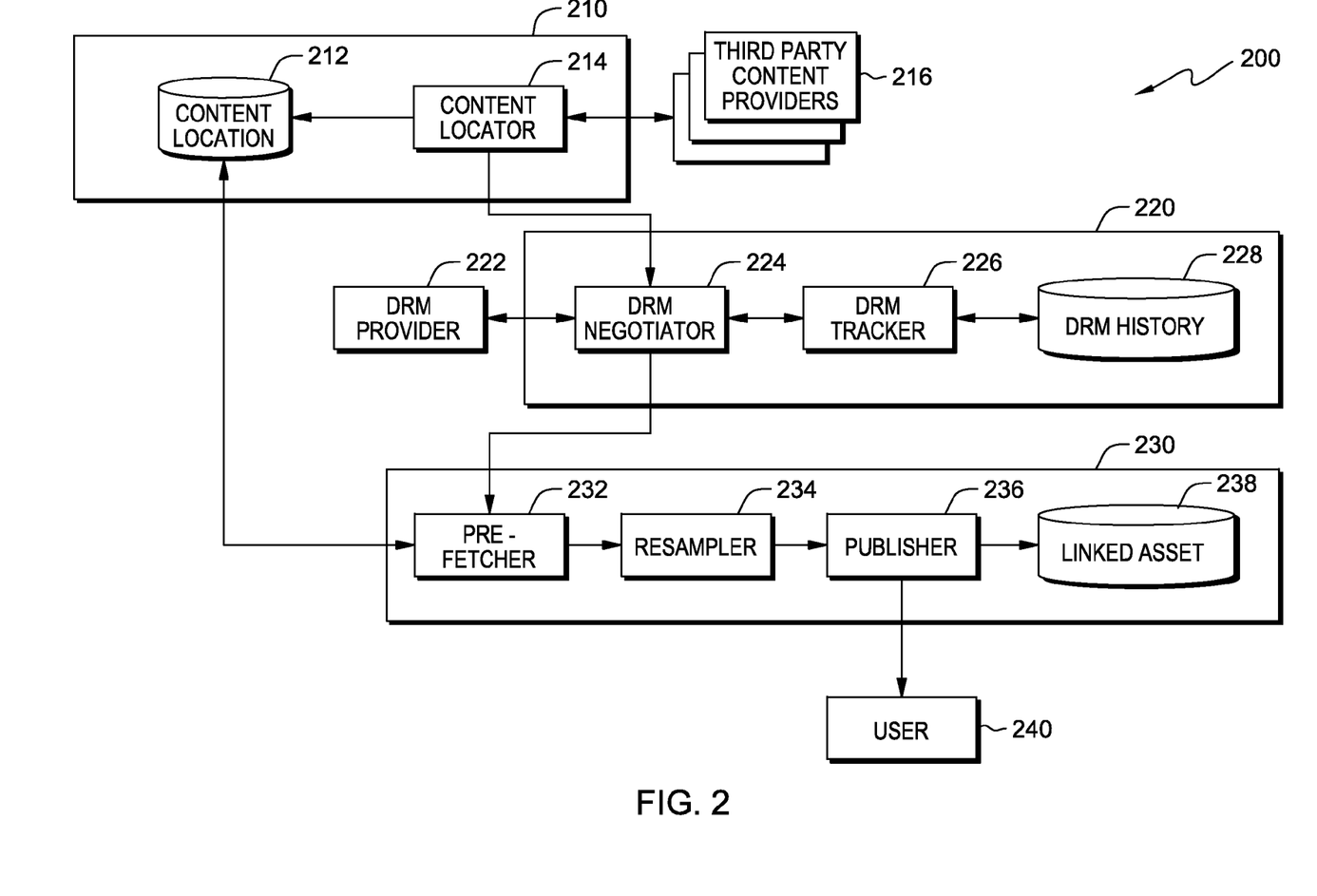
FIG. 2 is a flow diagram depicting the interaction of operational components of a linked asset composer program on a server computer within the video data processing environment of FIG. 1, in accordance with an embodiment of the present invention.

FIG. 2 is a flow diagram depicting the interaction of operational components of linked asset composer program 110 on server computer 108 within video data processing environment 100 of FIG. 1, providing linked asset composer program 110 with the capability to dynamically link video segments from distributed sources, in accordance with an embodiment of the present invention. Flow diagram 200 includes content location module 210, DRM module 220, and linked asset composer module 230.

Content location module 210 includes content location database 212 and content locator 214. Content locator 214 allows linked asset composer program 110 to receive a request from a user to locate one or more media content items, such as videos, video segments, audio recordings, or audio segments, and locates the media content item. A video or audio location may be represented by a URL that may be found in third party content providers 216. A video or audio location may also be represented by an address on client computing device 104 or on server computer 108. Content location database 212 stores addresses of the content.

DRM module 220 includes DRM negotiator 224, DRM tracker 226, and DRM history database 228. DRM negotiator 224 is the computer system component that allows linked asset composer program 110 to receive content locations from content locator 214, and to contact DRM provider 222 to negotiate the DRM governance, i.e., the usage rights and pricing of the requested content. DRM tracker 226 tracks the usage of the content in order to confirm that usage rights are current, and notifies DRM negotiator 224 when negotiated usage rights are nearing expiration, allowing DRM negotiator 224 to re-negotiate rights, if needed, in a timely manner. DRM history database 228 stores the negotiations and transactions between DRM negotiator 224 and DRM provider 222 for use in later negotiations.

Linked asset composer module 230 includes pre-fetcher 232, resampler 234, publisher 236, and linked asset database 238. Upon confirmation from DRM negotiator 224 that DRM governance is in place, pre-fetcher 232 accesses content location database 212 to pre-fetch the requested content, for example, video segments, for dynamic linking. Pre-fetching may include locating, downloading, and storing the content. Resampler 234 resamples the pre-fetched content and edits each video such that all of the videos in the final, linked asset have the same visual characteristics. Resampler 234 enables the final, linked asset to appear as one, seamless video. Publisher 236 publishes the linked asset such that a user with proper authorization, such as user 240, may access the linked asset for viewing. Linked asset database 238 stores the final, linked asset for future viewing or editing.

For example, a user wants to compose a video describing a current event in the news. The user provides URLs for three video segments to link together. Each video segment is located at a different URL on the Internet. Content locator 214 receives the three URLs and stores them in content location database 212. Content locator 214 also passes the three content locations to DRM negotiator 224. DRM negotiator 224 contacts DRM provider 222 for each of the video segments associated with the three URLs and negotiates usage rights and pricing. DRM negotiator 224 passes the negotiated rights and pricing to DRM tracker 226. DRM tracker 226 tracks the usage of the three video segments to confirm the usage is within the negotiated rights. As the term of the negotiated rights nears an end, DRM tracker 226 contacts DRM negotiator 224 to initiate further negotiations. DRM tracker 226 also stores the record of the usage of each of the three videos and the associated negotiated rights.

Responsive to successful DRM negotiations, pre-fetcher 232 pre-fetches the three videos using the addresses stored in content location database 212. Resampler 234 reviews a plurality of visual characteristic attributes of the three video segments. Attributes of video segment A and video segment B, such as frame rate and quality, are the same, but the frame rate and quality of video segment C are lower than those of video segments A and B. Resampler 234 resamples video segments A and B to reduce the frame rate and quality to equal the level of video C such that the frame rate and quality of all three video segments match.

Publisher 236 links the resampled video segments A, B and C, and publishes the linked video as one video with uniform digital characteristics. The publishing of the video may take many forms. In this example, publisher 236 posts a hyperlink to the video on a website of the user's choosing. Publisher 236 stores the final video in linked asset database 238.

Figure 3:
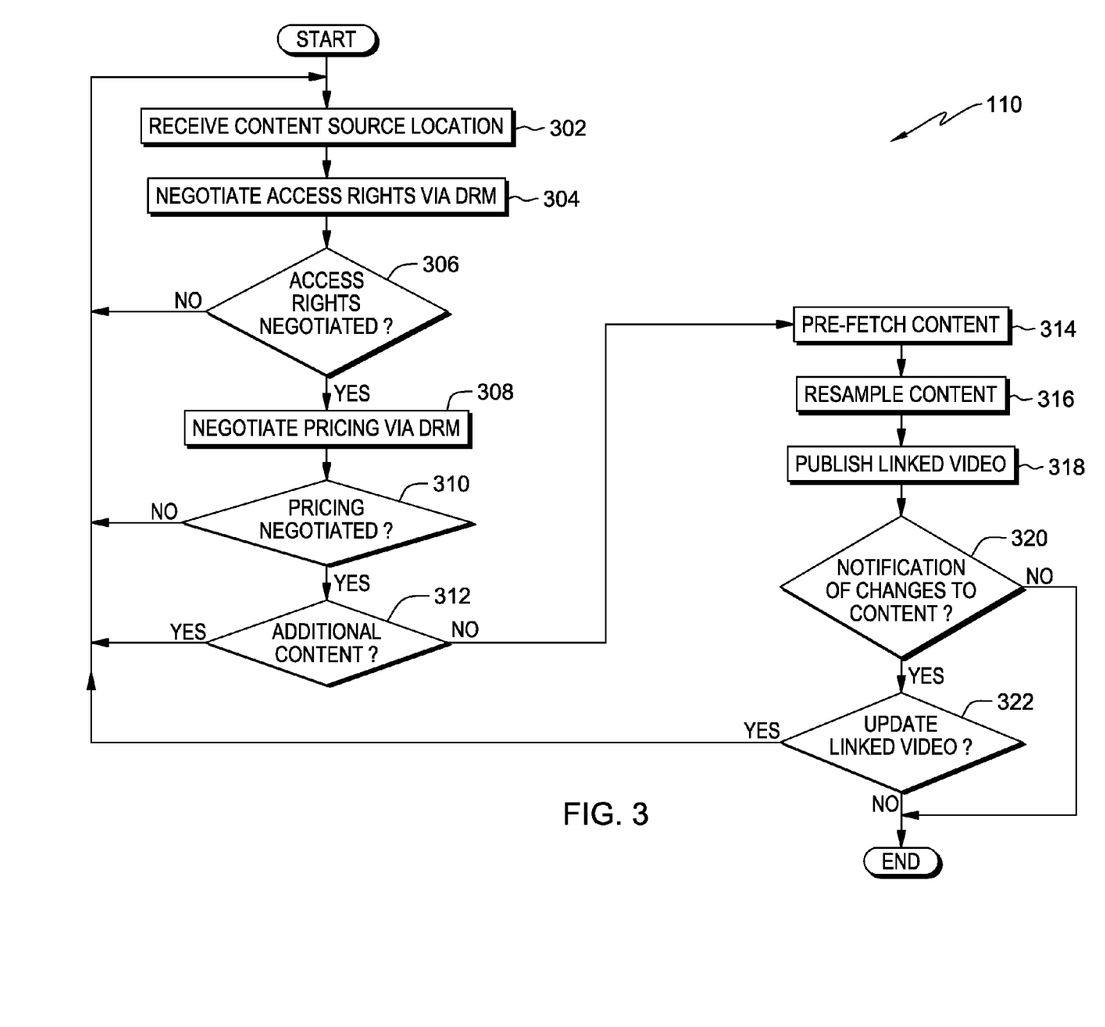
FIG. 3 is a flowchart depicting operational steps of a linked asset composer program, on a server computer within the video data processing environment of FIG. 1, in accordance with an embodiment of the present invention.

FIG. 3 is a flowchart depicting operational steps of linked asset composer program 110, on server computer 108 within video data processing environment 100 of FIG. 1, for dynamically linking video segments from distributed sources, in accordance with an embodiment of the present invention. FIG. 3 refers to components of server computer 108 as depicted in FIG. 1.

Linked asset composer program 110 receives content source location (step 302). A user can compose a video by either uploading existing videos or by linking to videos by specifying a local address or a direct URL to the video on the Internet. In addition, if the user does not want to link the full video, then the user may specify the time index (i.e., the duration with which to offset the linked video) and the duration of the linked video segment to be played. Linked asset composer program 110 receives the source of the video and any associated time index and duration information from the user via user interface 106. This information may be stored in database 112. For example, linked asset composer program 110 receives the URL "newsonvid.com" with a time index of 2 minutes and a duration of 30 seconds. In this example, the user wants to link the segment that starts at 2 minutes after the beginning of the video and continues for 30 seconds.

Linked asset composer program 110 negotiates access rights to the content via DRM (step 304). Linked asset composer program 110 parses each video or video segment specified by the target URL or local address to obtain the video and negotiates the access, or usage, rights. Linked asset composer program 110 uses a known DRM system, for example OpenDRM, in which a license may be encoded in a digital data file that defines usage rules, or usage expressions, such as range of criteria, frequency of access, expiration date, restriction of transfer to other devices, etc. As part of DRM negotiation, an agreement may be established on "initial" use of the video segments. For example, the initial agreement may be for a certain number of views, or for a certain time period, or any combination of attributes specified in the usage rules. Thereafter, as the usage limit nears, the DRM process starts again using the historical data in context to negotiate for better rights. Access rights information may be stored in database 112.

Linked asset composer program 110 determines whether the access rights negotiation is successful (decision block 306). If the access rights negotiation is not successful ("no" branch, decision block 306), then the content is not used, and linked asset composer program 110 returns to step 302 to receive the next content source location. In one embodiment, if the access rights negotiation is not successful, then linked asset composer program 110 may display an error message, via user interface 106. If the access rights negotiation is successful ("yes" branch, decision block 306), then linked asset composer program 110 negotiates pricing via DRM (step 308). DRM negotiations for pricing vary by content provider. For example, a content provider may create a pricing structure based on a number of views of the video. In another example, a content provider may create a pricing structure based on an elapsed period of time. In a further example, a content provider may create a pricing structure based on the type of content. Pricing information may be stored in database 112.

Linked asset composer program 110 determines whether the pricing negotiation is successful (decision block 310). If the pricing negotiation is not successful ("no" branch, decision block 310), then the content is not used, and linked asset composer program 110 returns to step 302 to receive the next content source location. In one embodiment, if the pricing negotiation is not successful, then linked asset composer program 110 may display an error message, via user interface 106. If the pricing negotiation is successful ("yes" branch, decision block 310), then linked asset composer program 110 determines whether the user requests additional content (decision block 312). Via user interface 106, linked asset composer program 110 queries the user to determine whether the user wants to add additional video segments. If the user requests additional content ("yes" branch, decision block 312), then linked asset composer program 110 returns to step 302 to receive the next content source location.

If the user does not request additional content ("no" branch, decision block 312), then linked asset composer program 110 pre-fetches content (step 314). Responsive to receiving the location of requested content sources and DRM governance completion, linked asset composer program 110 pre-fetches the requested content, such as video segments, from the associated locations. In one embodiment, pre-fetching video segments includes locating and downloading the video segments. In one embodiment, if a video is not found at the identified location, then linked asset composer program 110 may display an error message, via user interface 106. Linked asset composer program 110 may store the pre-fetched video segments in database 112.

Linked asset composer program 110 resamples the content (step 316). Linked asset composer program 110 performs a process of resampling on all successfully fetched videos or video segments. Resampling may be performed using a known tool, for example, VirtualDub. The process of resampling transforms the video segments to appear as one video with uniform digital characteristics once the segments are linked together. Videos from distributed source locations may not use the same codecs as the user, or as each other. In addition, the videos may have different attributes or characteristics, such as dimensions, frame rate, quality, audio frequency, etc. Resampling the segments runs them through a set of codecs to stabilize, resize, and smooth the transition from one segment to another, ensuring that the desired characteristics match from one segment to another. The resampling process may employ one or more codecs to decode, transform, and re-encode the video segments. As part of the transformation, resampling does not modify the original content, but resampling may modify the representation of the content. For example, linked asset composer program 110 may perform the resampling by reducing each video to the lowest common denominator of each of the attributes.

Linked asset composer program 110 publishes the linked video (step 318). Linked asset composer program 110 makes the video available for viewing by authorized users. For example, linked asset composer program 110 may add a hyperlink to the video on a website. The usage expressions, extracted during the DRM process, step 304, may be displayed at either the beginning or the end of the linked video. Usage expressions are the provider's rules for using the content, for example, the number of times a video may be viewed for the negotiated price.

Linked asset composer program 110 determines whether a notification of changes to the content is received (decision block 320). Through the life of the linked video, parties in the DRM ecosystem may be notified of any changes to the content for which rights have been negotiated. If linked asset composer program 110 determines that a notification of changes to content is not received ("no" branch, decision block 320), then the program ends. If linked asset composer program 110 determines that a notification of changes to content is received ("yes" branch, decision block 320), then the program determines whether to update the linked video (decision block 322). In one embodiment, linked asset composer program 110 notifies the user that updated content is available, and the user makes a decision as to whether or not to instruct the program to receive and resample the updated content. In another embodiment, linked asset composer program 110 determines whether or not to link to the updated content automatically. For example, linked asset composer program 110 may be capable of determining an error in a video, and if so, linking to the updated content automatically. In another example, if the license negotiated through DRM includes an agreement that the content provider provides all content pertaining to a particular subject or from a particular feed, then linked asset composer program 110 may automatically receive all updates with no user intervention. In another embodiment, linked asset composer program 110 checks with the provider of each of the segments periodically, for example, once a day, to determine whether updated content is available.

If linked asset composer program 110 determines not to update the linked video ("no" branch, decision block 322), then the program ends. A user may receive notification of updates to the content provided earlier, but the user does not want to obtain the updates to the content because the cost outweighs the value. For example, if the change to the content is only a change to the visual characteristics, and the original content is already resampled to match other segments, then the cost of the updated content may outweigh the value. If linked asset composer program 110 determines to update the linked video ("yes" branch, decision block 322), then the program returns to step 302 to receive the new content source location, and proceeds with the remaining steps to publish an updated linked video. A user may receive notification of updates to the content provided earlier, and the user does want to obtain the updates to the content because the value outweighs the cost. For example, if there is an error in the content of the original video, such as an incorrect name stated, the value to update the video may outweigh the cost.

Figure 4:
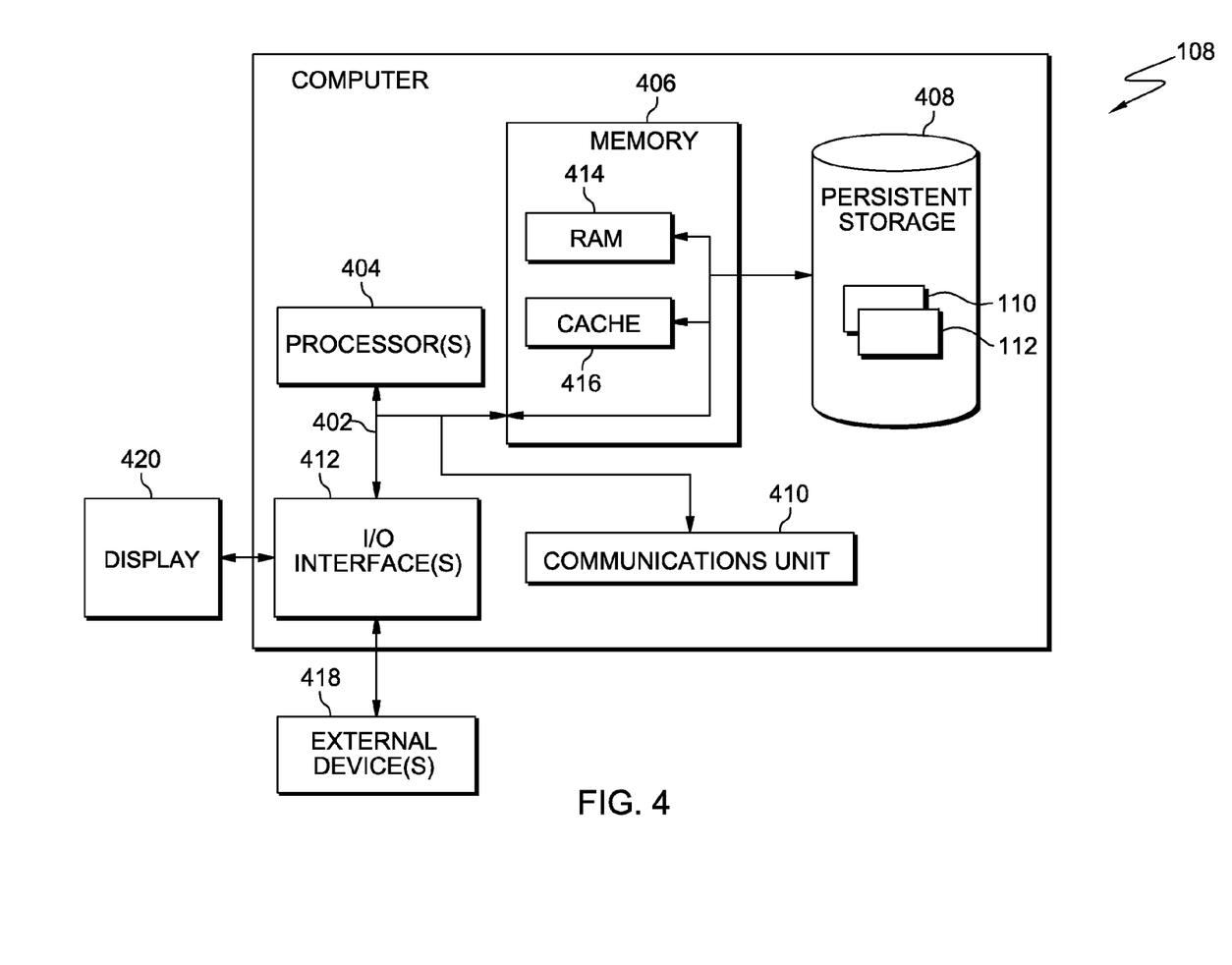
FIG. 4 depicts a block diagram of components of the server computer within the video data processing environment of FIG. 1, in accordance with an embodiment of the present invention.

FIG. 4 depicts a block diagram of components of server computer 108 within video data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server computer 108 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Linked asset composer program 110 and database 112 are stored in persistent storage 408 for execution and/or access by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 104. In these examples, communications unit 410 includes one or more network interface cards. Communications unit 410 may provide communications through the use of either or both physical and wireless communications links. Linked asset composer program 110 and database 112 may be downloaded to persistent storage 408 through communications unit 410.

I/O interface(s) 412 allows for input and output of data with other devices that may be connected to server computer 108. For example, I/O interface(s) 412 may provide a connection to external device(s) 418 such as a keyboard, a keypad, a touch screen, a microphone, a digital camera, and/or some other suitable input device. External device(s) 418 can also include portable computer readable storage media such as, for example, thumb drives, portable optical or magnetic disks, and memory cards. Software and data used to practice embodiments of the present invention, e.g., linked asset composer program 110 and database 112, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for media content composition from distributed sources, the method comprising the steps of:
   receiving, by one or more computer processors, one or more media content source locations;
   determining, by the one or more computer processors, two or more media content items associated with the one or more received media content source locations;
   negotiating, by the one or more computer processors, digital rights associated with the two or more media content items;
   responsive to negotiating digital rights associated with the two or more media content items, pre-fetching, by the one or more computer processors, the two or more media content items from the one or more media content source locations;
   determining, by the one or more computer processors, at least one digital characteristic of a first media content item of the two or more media content items does not match at least one digital characteristic of a second media content item of the two or more media content items;
   responsive to determining at least one digital characteristic of a first media content item of the two or more media content items does not match at least one digital characteristic of a second media content item of the two or more media content items, resampling, by the one or more computer processors, the first media content item of the two or more media content items; and
   publishing, by the one or more computer processors, a composition of the two or more media content items to appear as one linked asset with uniform digital characteristics,
   wherein receiving one or more media content source locations further comprises the step of receiving, by the one or more computer processors, a time index and duration associated with at least one of the two or more media content items associated with the one or more content source locations, wherein the time index and duration are user defined,
   wherein determining at least one of the two or more media content items further comprises the step of determining, by the one or more computer processors, a segment of the at least one of the two or more media content items based on the time index and duration.

2. The method of claim 1, wherein resampling the first media content item of the two or more media content items comprises the step of editing, by the one or more computer processors, the first media content item such that the two or more media content items have uniform digital characteristics, wherein the at least one digital characteristic of the first media content item and the at least one digital characteristic of the second media content item relate to audio frequency or frame rate.

3. The method of claim 1, wherein a media content item includes at least one of a video, a video segment, an audio recording, and an audio segment.

4. The method of claim 1, further comprising the steps of:
   responsive to publishing a composition of the two or more media content items to appear as one linked asset with uniform digital characteristics, receiving, by the one or more computer processors, a notification that at least one of the two or more media content items has changed; and
   determining, by the one or more computer processors, to update the one linked asset with uniform digital characteristics with the at least one changed media content item.

5. The method of claim 1, wherein negotiating digital rights associated with the two or more media content items further comprises the steps of:
   negotiating, by the one or more computer processors, one or more rights to the two or more media content items; and
   negotiating, by the one or more computer processors, pricing associated with the one or more rights to the two or more media content items.

6. The method of claim 1, wherein pre-fetching the two or more media content items from the one or more media content source locations further comprises the steps of:
   locating, by the one or more computer processors, the two or more media content items from the one or more media content source locations;
   downloading, by the one or more computer processors, the two or more media content items from the one or more media content source locations; and
   storing, by the one or more computer processors, the two or more media content items from the one or more content source locations.

7. A computer program product for media content composition from distributed sources, the computer program product comprising:

one or more non-transitory computer readable storage media and program instructions stored on the one or more computer readable storage media, the program instructions comprising:

program instructions to receive one or more media content source locations;

program instructions to determine two or more media content items associated with the one or more received media content source locations;

program instructions to negotiate digital rights associated with the two or more media content items;

responsive to negotiating digital rights associated with the two or more media content items, program instructions to pre-fetch the two or more media content items from the one or more media content source locations;

program instructions to determine at least one digital characteristic of a first media content item of the two or more media content items does not match at least one digital characteristic of a second media content item of the two or more media content items, wherein the at least one digital characteristic of the first media content item and the at least one digital characteristic of the second media content item relate to audio frequency or frame rate;

responsive to determining at least one digital characteristic of a first media content item of the two or more media content items does not match at least one digital characteristic of a second media content item of the two or more media content items, program instructions to resample the first media content item of the two or more media content items; and program instructions to publish a composition of the two or more media content items to appear as one linked asset with uniform digital characteristics, wherein the program instructions to receive one or more media content source locations further comprises program instructions to receive a time index and duration associated with at least one of the two or more media content items associated with the one or more content source locations, wherein the time index and duration are user defined, wherein the program instructions to determine at least one of the two or more media content items further comprises program instructions to determine a segment of the at least one of the two or more media content items based on the time index and duration.

8. The computer program product of claim 7, wherein program instructions to resample the first media content item of the two or more media content items comprises program instructions to edit the first media content item such that the two or more media content items have uniform digital characteristics.

9. The computer program product of claim 7, wherein a media content item includes at least one of a video, a video segment, an audio recording, and an audio segment.

10. The computer program product of claim 7, further comprising:

responsive to publishing a composition of the two or more media content items to appear as one linked asset with uniform digital characteristics, program instructions to receive a notification that at least one of the two or more media content items has changed; and program instructions to determine to update the one linked asset with uniform digital characteristics with the at least one changed media content item.

11. The computer program product of claim 7, wherein program instructions to negotiate digital rights associated with the two or more media content items further comprises:

program instructions to negotiate one or more rights to the two or more media content items; and program instructions to negotiate pricing associated with the one or more rights to the two or more media content items.

12. The computer program product of claim 7, wherein program instructions to pre-fetch the two or more media content items from the one or more media content source locations further comprises:

program instructions to locate the two or more media content items from the one or more media content source locations;

program instructions to download the two or more media content items from the one or more media content source locations; and program instructions to store the two or more media content items from the one or more content source locations.

13. A computer system for media content composition from distributed sources, the computer system comprising:

one or more computer processors;

one or more computer readable storage media;

program instructions stored on the computer readable storage media for execution by at least one of the one or more processors, the program instructions comprising:

program instructions to receive one or more media content source locations;

program instructions to determine two or more media content items associated with the one or more received media content source locations;

program instructions to negotiate digital rights associated with the two or more media content items;

responsive to negotiating digital rights associated with the two or more media content items, program instructions to pre-fetch the two or more media content items from the one or more media content source locations;

program instructions to determine at least one digital characteristic of a first media content item of the two or more media content items does not match at least one digital characteristic of a second media content item of the two or more media content items;

responsive to determining at least one digital characteristic of a first media content item of the two or more media content items does not match at least one digital characteristic of a second media content item of the two or more media content items, program instructions to resample the first media content item of the two or more media content items; and program instructions to publish a composition of the two or more media content items to appear as one linked asset with uniform digital characteristics, wherein the program instructions to receive one or more media content source locations further comprises program instructions to receive a time index and duration associated with at least one of the two or more media content items associated with the one or more content source locations, wherein the time index and duration are user defined, wherein the program instructions to determine at least one of the two or more media content items further comprises program instructions to determine a segment of the at least one of the two or more media content items based on the time index and duration.

14. The computer system of claim 13, wherein program instructions to resample the first media content item of the two or more media content items comprises program instructions to edit the first media content item such that the two or more media content items have uniform digital characteristics, wherein the at least one digital characteristic of the first media content item and the at least one digital characteristic of the second media content item relate to audio frequency or frame rate.

15. The computer system of claim 13, wherein a media content item includes at least one of a video, a video segment, an audio recording, and an audio segment.

16. The computer system of claim 13, further comprising:
responsive to publishing a composition of the two or more media content items to appear as one linked asset with uniform digital characteristics, program instructions to receive a notification that at least one of the two or more media content items has changed; and
program instructions to determine to update the one linked asset with uniform digital characteristics with the at least one changed media content item.

17. The computer system of claim 13, wherein program instructions to pre-fetch the two or more media content items from the one or more media content source locations further comprises:
program instructions to locate the two or more media content items from the one or more media content source locations;
program instructions to download the two or more media content items from the one or more media content source locations; and
program instructions to store the two or more media content items from the one or more content source locations.

* * * * *